United States Patent [19]

Hutchison et al.

[11] Patent Number: 4,771,856

[45] Date of Patent: Sep. 20, 1988

[54] SINGLE LEVER CONTROL FOR VEHICLE BELT DRIVE

[75] Inventors: Wayne R. Hutchison, Mayville; John B. Kuhn, Rubicon, both of Wis.

[73] Assignee: Deere & Company, Moline, Ill.

[21] Appl. No.: 53,983

[22] Filed: May 26, 1987

Related U.S. Application Data

[63] Continuation-in-part of Ser. No. 922,776, Oct. 27, 1986, abandoned, which is a continuation of Ser. No. 769,296, Aug. 26, 1985, abandoned.

[51] Int. Cl.<sup>4</sup> ............................................. B60K 26/00
[52] U.S. Cl. ................................. 180/333; 74/471 R; 74/473 R; 474/1
[58] Field of Search ............. 180/333, 336; 74/471 R, 74/473 R, 475; 474/1–8, 900

[56] References Cited

U.S. PATENT DOCUMENTS

4,201,095  5/1980  Cirami .................................... 74/475
4,301,902  11/1981  Gatsos et al. ............................ 474/1

*Primary Examiner*—Kenneth R. Rice

[57] ABSTRACT

An improved vehicle control system for a vehicle having an engine which produces output torque through an output sheave and a transaxle mounted to the vehicle's frame, the transaxle being selectively operational in forward, neutral and reverse modes in response to a mode selection link operatively connected to the transaxle. The transaxle functions as a gear box having a single gear ratio between the input sheave and the drive axles in both the forward and reverse operating modes, a transaxle and a brake. The output sheave of the engine is in communication with the input sheave through a first and second belt drivingly mounted to a plurality of sheaves and a variator such that an increase in tension on a first belt causes the variator to increase the rate of rotation of a second belt. A speed range sheave mounted to an arm is operatively connected to the first belt. A single lever is mounted to the vehicle such that the arm is selectively positionable to effect the rotation rate of the second belt through the variator which determined the speed of the vehicle. The position of the arm is also altered by displacement of a clutch rod in such a manner that when the clutch rod is returned to the engaged position, the vehicle will resume to its previously selected speed.

22 Claims, 9 Drawing Sheets

SINGLE LEVER CONTROL FOR VEHICLE BELT DRIVE

CROSS REFERENCE TO EARLIER FILED APPLICATIONS

This application is a continuation-in-part of application Ser. No. 922,776 filed 27 Oct. 1986 now abandoned which is a continuation of Ser. No. 769,296 filed 26 Aug. 1985 now abandoned which are both hereby incorporated by reference.

BACKGROUND OF THE INVENTION

The invention relates to vehicles having belt drive systems and, more particularly, to vehicles, such as riding mowers, which utilize a transaxle, also functioning as a gear box and as a brake, having a single reverse and forward gear ratio.

It is known to use a transaxle, which functions as a brake and a gear box, on vehicles such as riding mowers, having a single gear ratio between the transaxle input and output in the forward and reverse modes. In such application, it is known to have the vehicle's engine drive a first belt which acts either directly or indirectly on a variator which in turn causes a second belt to drive the input sheave to the transaxle. By varying the tension on the first belt, the variator increases or decreases the speed of rotation of the second belt. The benefit of using a vehicle belt drive, as described, is that the performance characteristic of a hydrostatic drive may be simulated without incurring the requisite expense associated with conventional hydrostatic transmissions. With a belt drive system, a vehicle operator may select, from a plurality of vehicle speeds, that one speed uniquely suited for the particular situation.

It is common practice to mount a plurality of control levers and pedals on riding mowers employing a transaxle of the type aforedescribed. It is conventional to use separate controls to shift the transaxle for directional change and to vary the speed of the belt drive.

However, if vehicle direction and speed could be controlled by a single control lever much like that employed in conjunction with vehicles having hydrostatic transmissions, it would enhance operator convenience and simplify the operation thereof. Additionally, if a means were provided whereby an operator could resume a previously selected speed subsequent to temporarily slowing the vehicle to perform ephemeral tasks such as maneuvering close to trees, buildings, etc. without having to shift speeds by moving a speed control lever, the operation thereof would be further simplified and operator convenience would be further enhanced.

Thus, there is a need for a single lever control for a vehicle belt drive which provides for both mode and speed control; which provides for speed control without shifting the control lever; which provides for the resumption of an originally set speed after slowing for any reason without shifting the control lever and which provides for simplified operation and operator convenience.

SUMMARY OF THE INVENTION

The present invention is a speed and mode control system for a vehicle, such as a riding mower, having an operator's station with a clutch pedal and a brake pedal located therein. The vehicle's engine delivers torque to an output sheave. A transaxle is mounted to the underside of the vehicle's frame and is in belt driven communication with the engine output sheave. The transaxle is selectively operational in forward, neutral and reverse modes in response to a mode selection link operatively connected to the transaxle. The transaxle also functions as a gear box having a single gear ratio between the input sheave and the output drive axles in both the forward and reverse operating modes. The input sheave of the transaxle is in communication with the output sheave of the engine through first and second belts drivingly mounted to a plurality of sheaves and a variator such that an increase in tension on a first belt causes the variator to increase the rate of rotation of the second belt.

To selectively control the tension of the first belt and the transaxle operating mode, a first rod is pivotally mounted to the frame. A cam containing a cam slot is fixably mounted to the first rod. Also, operatively mounted to the first rod and extending into the operator's station is a shift lever. Slidably mounted in the cam slot is a cam follower having a cam link rotatably mounted to the cam follower at one end. The cam link is pivotally mounted to a first support member at a point along the cam link. A mode selection rod is pivotally mounted at one end to another end of the cam link and pivotally mounted at the other end to the mode selection link of the transaxle, displacement of the shift lever thereby causing the transaxle to assume one of the operating modes.

Preferably, a second cam and alternatively linkage means are provided for selectively increasing and decreasing the tension on the first belt in response to further rotational displacement of the first rod by a shift lever. A clutch pedal is coupled to the provided cam or linkage means to decrease the tension applied to the first belt resulting in reduced vehicle speed such that when the clutch pedal is released, the tension level on the first belt returns to its previous selected level resulting in the vehicle resuming its previous speed.

It is an objective of the present invention to provide a control system which utilizes only a single lever control for controlling both the speed and the direction or mode of a vehicle, such as a riding mower, having a transaxle which functions as a transaxle, gear box and brake.

It is a further objective of the present invention to provide a control system wherein depression of the clutch pedal slows the speed of the vehicle without shifting from the selected speed and upon the return of the clutch pedal to the full engaged position allows the vehicle to resume its previously selected speed.

Other objects and advantages of the invention will be apparent from the following description, accompanying drawings and appended claims.

DETAILED DESCRIPTION OF THE ORIGINAL EMBODIMENT

Figure 1:
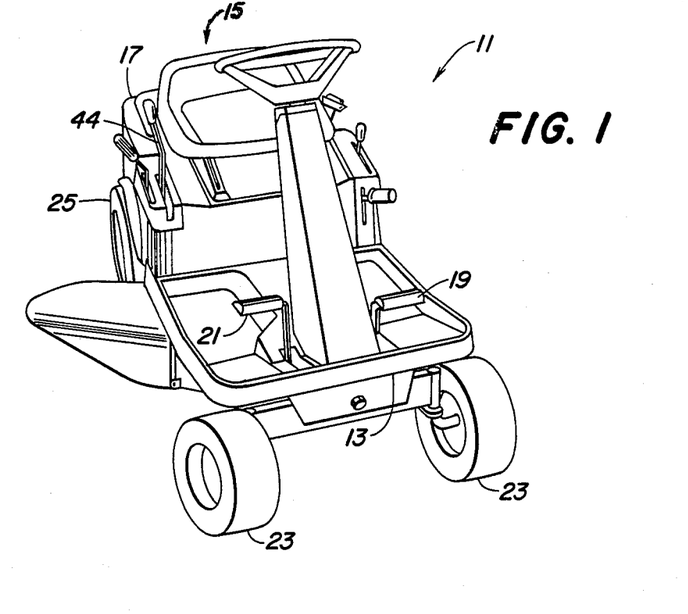
FIG. 1 is a perspective view of a riding mower employing a control system in accordance with the present invention.

Referring more particularly to FIG. 1, a vehicle such as a small lawn and garden tractor or riding mower, generally indicated as 11, includes a frame 13 having a conventional operator's station 15 and an engine compartment 17 housing an engine (not shown). The operator's station 15 includes a clutch pedal 19 and a brake pedal 21. A plurality of steering wheels 23 and drive wheels 25 are conventionally mounted to the frame 13 for supporting the vehicle 11.

Figure 2:
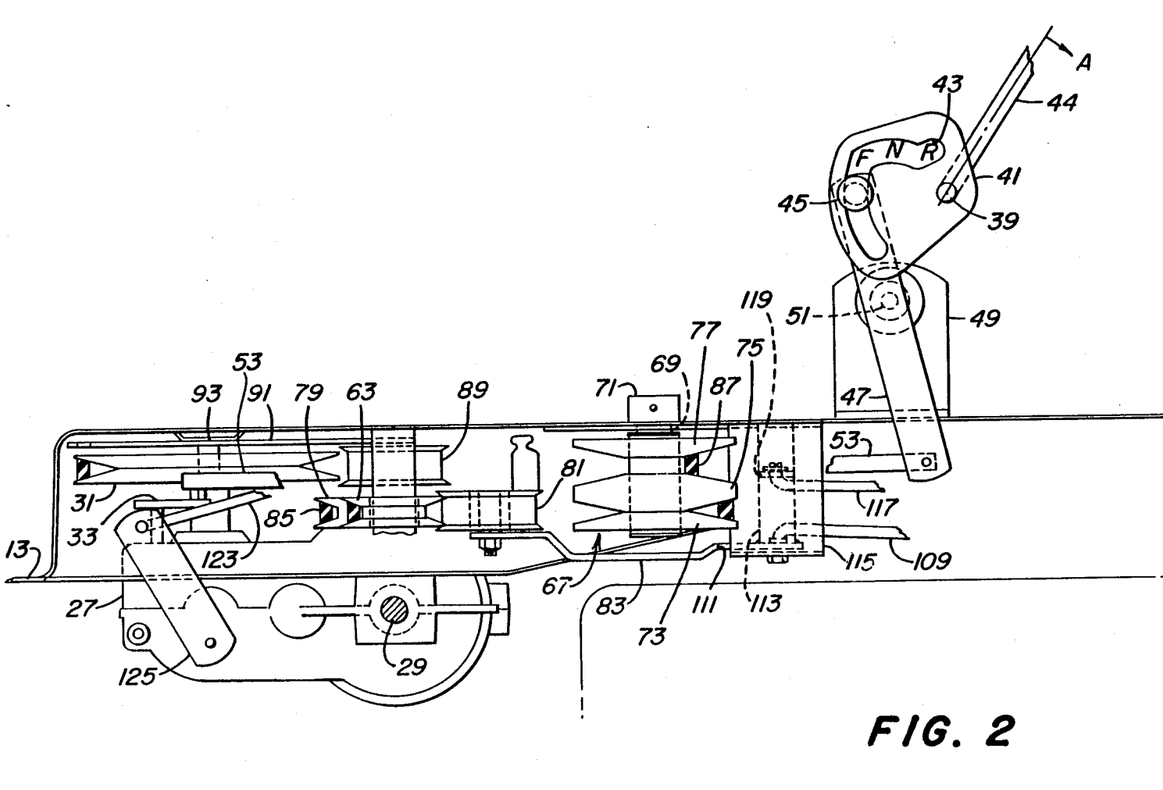
FIG. 2 is a sectioned side view of one embodiment of the control system.

Referring more particularly to FIG. 2, the frame 13 has fixably mounted to the underside by any conventional means a transaxle 27 which may perform the function of a gear box, transaxle and brake. The transaxle 27 is of a generally conventional design having an input sheave 31 for receiving input torque. Extending transversely from each side of the transaxle 27 is a drive axle 29 fixably mounted to a respective drive wheel 25 by any conventional means. The transaxle 27 also includes, as a constituent component, a mode selection link 33 which causes the transaxle to operate in a single reverse mode gear ratio "R", neutral "N" and a single forward mode gear ratio "F".

Figure 3:
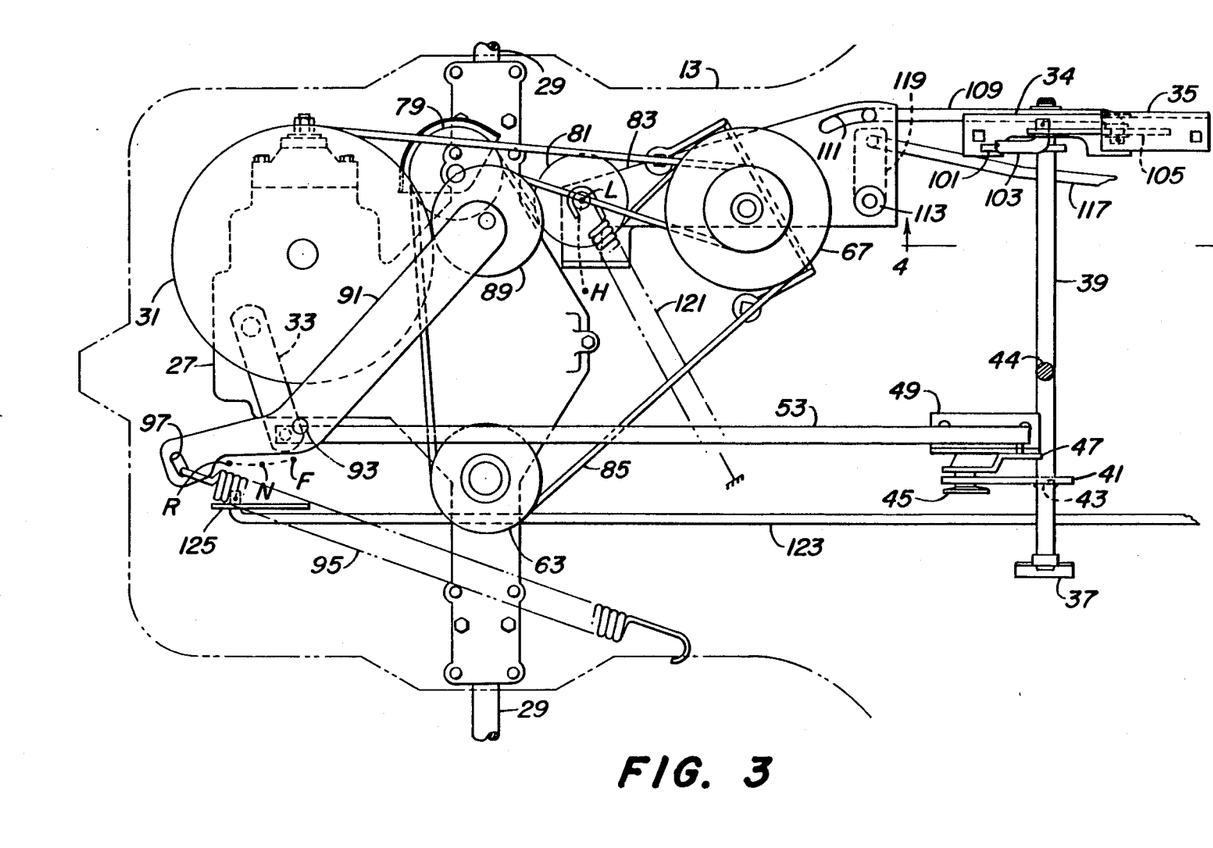
FIG. 3 is a top view of the control system of FIG. 2.

Referring now to FIG's. 2 and 3, a support member 34 and a support member 37 are conventionally mounted to the frame 13. The support members 34 and 37 pivotally support a rod 39 by conventional means such that rod 39 extends transversely across the frame 13. Fixably mounted to the rod 39 by conventional means is a cam 41 defining a cam slot 43, and a shift lever 44. A cam follower 45 is slidably mounted in cam slot 43 to ride therein in a conventional manner. The cam follower 45 is pivotally mounted by conventional means to one end of a cam link 47. A support member 49 which is fixably mounted atop frame 13 has the cam link 47 pivotally mounted thereto at 51. At the other end of cam link 47 is pivotally mounted by any conventional means a mode selection rod 53. The other end of the mode selection rod 53 is pivotally mounted by any conventional means to the mode selection link 33 of the transaxle 27.

It is observed that pivotal placement of the cam 41 by the shift lever 44 causes the cam follower 45 to pivotally displace within the cam slot 43 to a position indicated as either "F", "N" or "R", i.e. forward, neutral or reverse, respectively. Displacement of the cam follower 45 results in displacement of the mode section rod 53 and the mode selection link 33 to a corresponding "F", "N" or "R" position, thereby setting the transaxle operation mode.

Torque is supplied to the transaxle input sheave 31 through a plurality of sheaves and a conventional variator in the subsequentially described manner from the vehicle's engine. The engine conventionally drives a sheave 63. A conventional variator, indicated as 67, is rotatably mounted on a pin 69 which pin 69 has a portion extending through the frame 13 and, is conventionally secured thereto by a lock nut 71. The variator 67 includes a first fixed location sleeve 73, a variator sleeve 75, and a second fixed location sleeve 77 wherein the variator sleeve 75 is located between the sleeves 73 and 77.

An idler sheave 79 is continuously rotatably mounted to the transaxle 27 and a speed range sheave 81 is mounted on an arm 83 subsequently described in greater detail. A first belt 85 communicates sheaves 63, 79 and speed range sheave 81 to the variator 67, the belt 85 being located between variator sleeve 75 and sleeve 73. A second belt 87 communicates variator 67 to input sheave 31 and a second idler sheave 89, rotatably mounted to one end of a generally V-shaped arm 91 which is conventionally pivotally mounted to the frame 13 at 93. A tension spring 95 is connected in a slot 97 at the other end of arm 91. The other end of tension spring 95 is connected to frame 13.

It is therefore observed by one skilled in the art that the vehicle's engine drives sheave 63 which in turn drives variator 67, speed range sheave 81 and idler sheave 79 through the instrumentality of belt 85. The variator 67 in response drives input sheave 31 and idler sheave 89 through the instrumentality of belt 87. It is further noted that by changing the rate of rotation of the input sheave 31, the speed of the vehicle 11 is proportionally changed.

Figure 4:
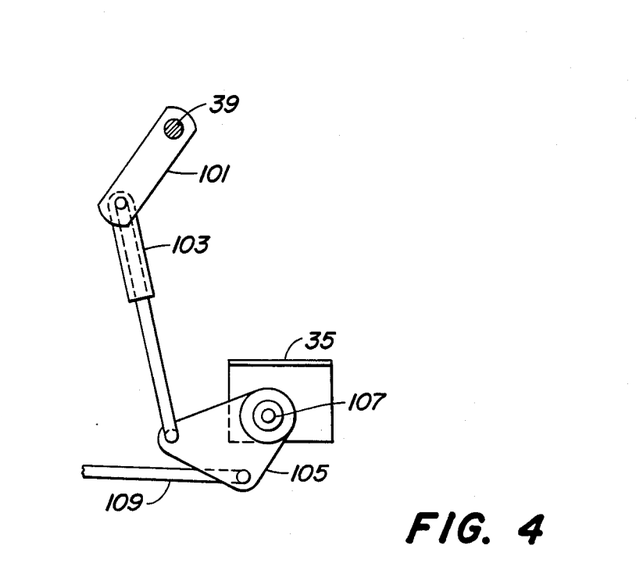
FIG. 4 is a sectioned side view of the control system along line 4—4 of FIG. 3.

To selectively change the rate of rotation of the input sheave 31 in the forward transaxle mode, a link 101 is fixably mounted to rod 39 at one end (refer also to FIG. 4). The other end of link 101 is pivotally mounted by any conventional means to one end of an adjustable linking rod 103. The other end of linking rod 103 is pivotally mounted by any conventional means to a transfer link 105. The transfer link 105 in turn is pivotally mounted by any conventional means to support member 35 at 107. One end of a rod 109 is also pivotally mounted to the transfer link 105 at one end. The other end of rod 109 is slidably mounted in a slot 111 in the arm 83. Arm 83 is fixably mounted to a short shaft 113 which in turn is pivotally mounted in a brace 115, the brace 115 being fixably mounted by any conventional means such as welding to the frame 13. A spring 121 is anchored between arm 83 and the frame and provides constant biasing on arm 83 to the high speed position such that rod 109 is normally bottomed out in the forward end of slot 111.

It is therefore observed that by displacing shift lever 44 further in the forward direction as indicated by arrow "A", linking rods 101 and 103 are caused to rotate transfer link 105 and, thereby, displace rod 109 thereby permitting pivotal displacement of arm 83. The displacement of arm 83 causes speed range sheave 81 to move toward the high speed position which causes the variator 67 to respond by increasing the rpm rate of belt 87 in a conventional manner.

The arm 83 can arch though a low to high speed range indicated respectively as "L" and "H". A spring 121 fixably mounted to arm 83 in any conventional manner provides constant biasing on arm 83 to the high speed position. A conventional speed select plate retains the shift lever 44 in the selected position.

Transaxle shifting is accomplished in a conventional manner within the transaxle 27 as the mode selection link 33 is precedingly moved from neutral to forward "F" or in like manner from neutral to reverse "R".

When depressed, the clutch pedal 19 slows down the vehicle 11. The vehicle 11 will resume the previous speed selected when the clutch pedal 19 is released from a fully depressed or partially depressed position. To accomplish resumption of the previous speed, the clutch pedal 19 is conventionally pivotally mounted to one end of a clutch rod 117. The other end of clutch rod 117 is pivotally mounted to a tab 119 which in turn is fixably mounted to shaft 113. Thus, when the clutch pedal 19 is depressed, clutch rod 117 causes shaft 113 to rotate through the instrumentality of tab 119. The rotation of shaft 113 causes the arm 83 to displace to a lower speed position by causing the speed range sheave 81 to reduce the tension on belt 85. Slot 111 allows rod 109 to slide therein. Release of the clutch pedal 19 permits spring 121 to bias arm 83 to the previously held speed position against rod 109. Operation in the reverse mode is similar to operation in the forward mode and thus will not be discussed in detail.

Braking of the vehicle 11 is provided by a brake pedal 21 conventionally pivotally mounted in the operator's station 15. A rod 123 is pivotally mounted to the brake pedal 21 at one end and conventionally pivotally mounted to a transaxle brake lever 125 constituent to the transaxle 27 at the other end.

DETAILED DESCRIPTION OF AN IMPROVED EMBODIMENT

As shown in FIGS. 5-11, the details of improved single lever control system for a belt driven vehicle generally designated 200 include support members 34 and 37 conventionally connected to the frame 13. The support members 34 and 37 conventionally support a pivotable rod 39 extending transversely across the frame. A pair of cams 202 and 204 are conventionally mounted on the rod 39. These cams, a mode selection cam 202 and a speed control cam 204, are an improvement over the mode and speed control members of the first embodiment described above.

Figure 5:
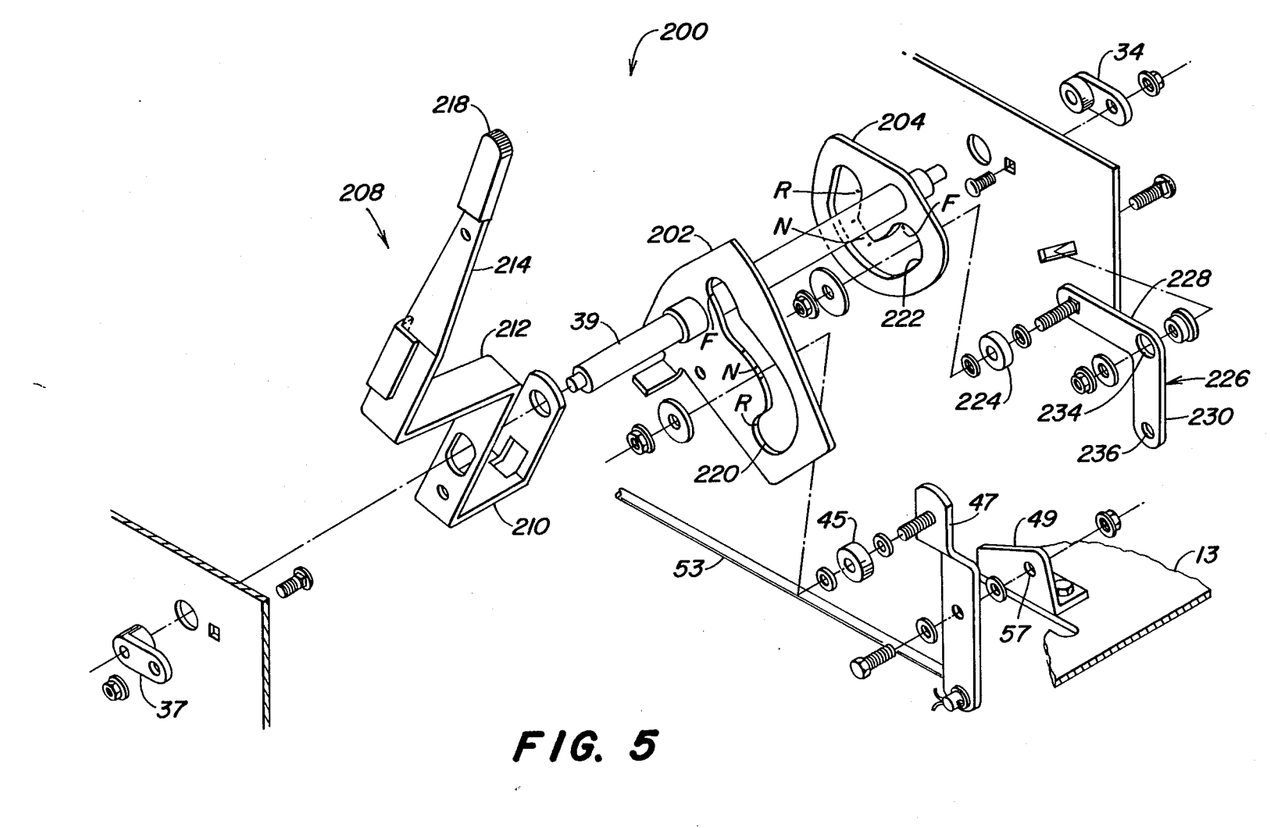
FIG. 5 is a partial exploded perspective view of an improved control system of the present invention illustrating the control lever and the mode and speed cams.

Operatively connected to the rod 39 is a shift lever 208 consisting of a U-shaped member 210 having a generally rectangular portion 212 connected to one of the U-portion 210 and a lever portion 214 connected to the rectangular portion 212 and generally perpendicular to the portion 212. The end of the lever portion 214 receives a knob 218.

Figure 9:
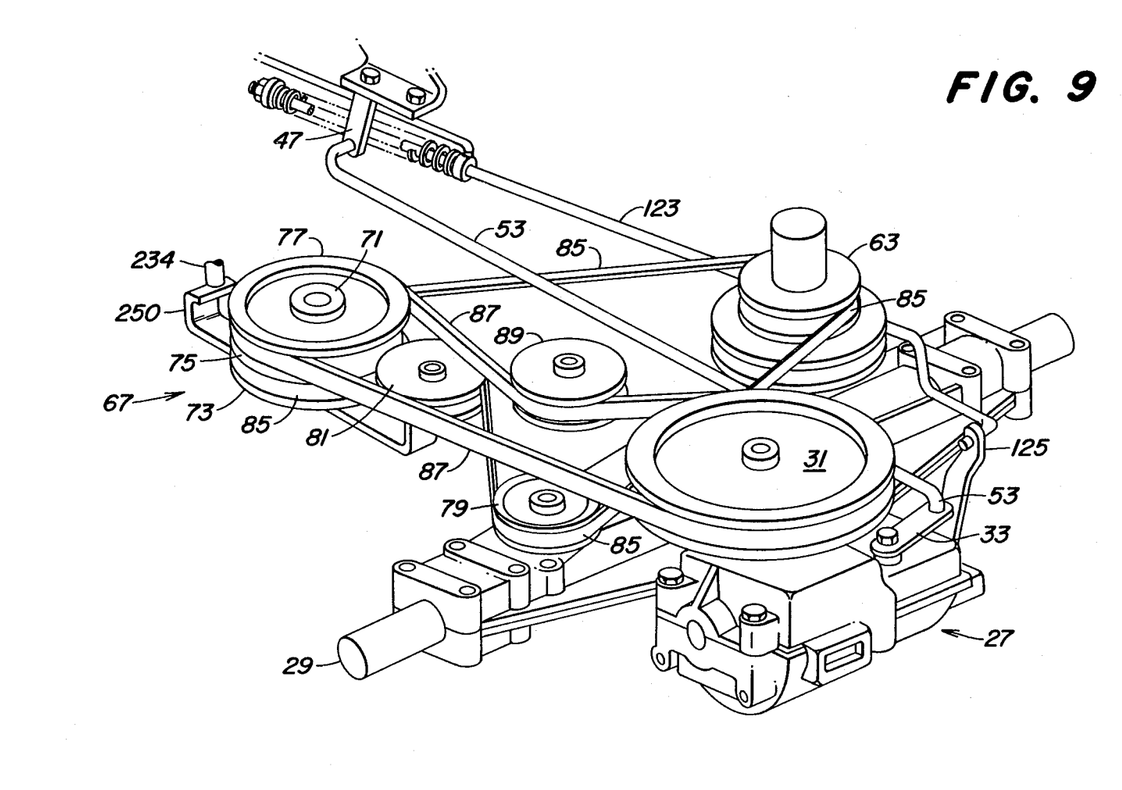
FIG. 9 is a partial perspective view of the control system illustrating the belt system of the present invention.

The shift mechanism 208 is mounted on shaft 39 and a cam follower 45 is slidably mounted in cam slot 220. The cam follower 45 is conventionally pivotally mounted to one end of a cam link 47. The cam link 47 is conventionally pivotally mounted to the frame 13 by support member 49 at pivot point 57. The other end of cam link 47 is conventionally pivotally mounted to a mode selection rod 53 as shown in FIGS. 5 and 9. The other end of the mode selection rod 53 is pivotally connected to mode selection link 33 of transaxle 27.

Figure 6:
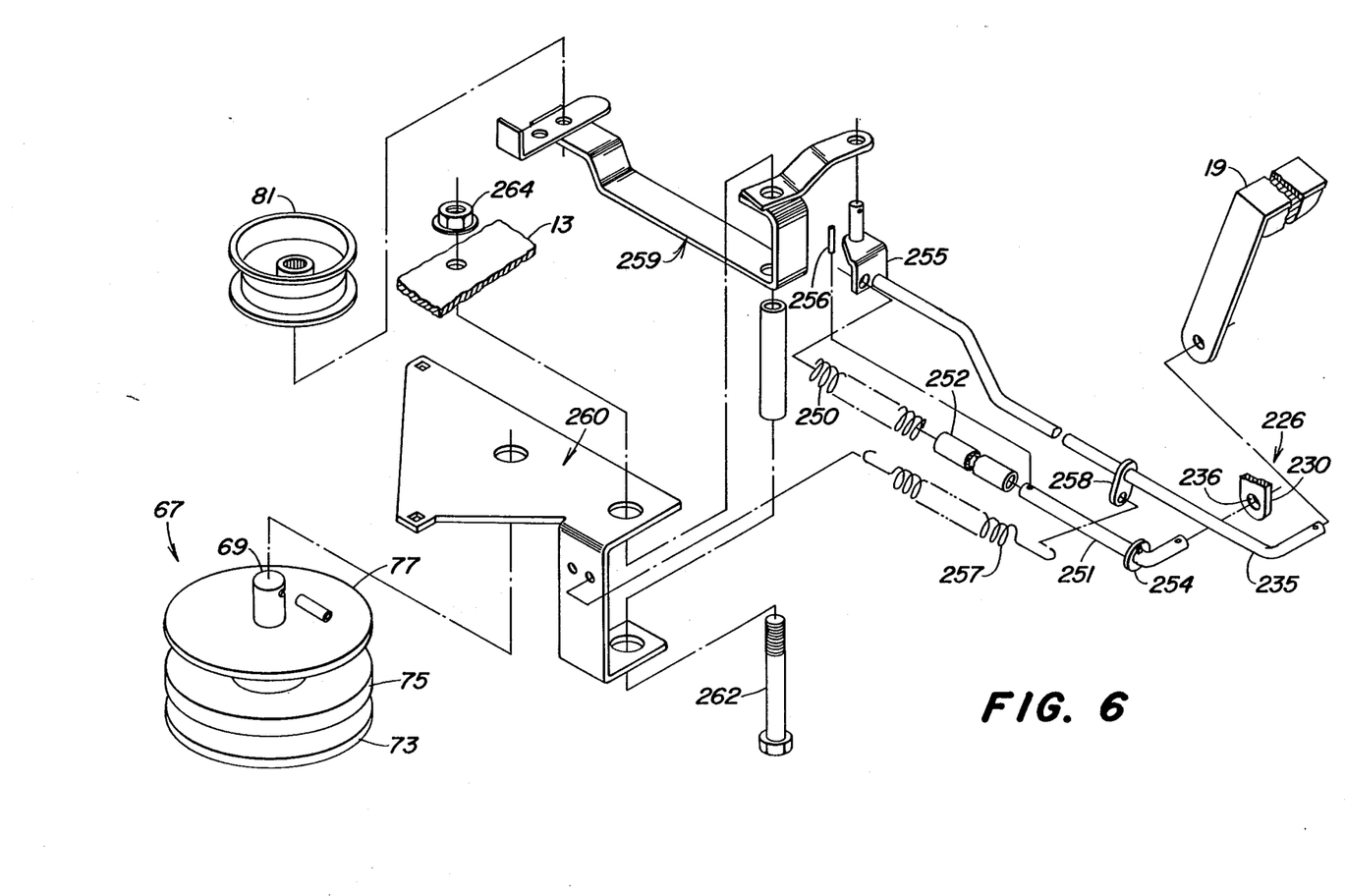
FIG. 6 is a partial exploded perspective view of the improved control system of the present invention illustrating the components of the sheave, variator and clutch.
Figure 10:
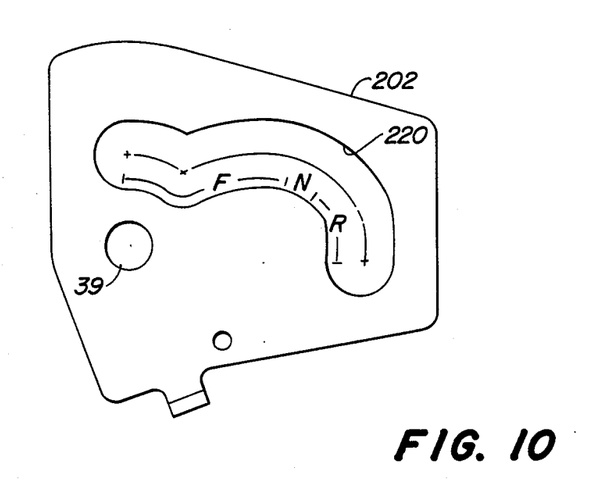
FIG. 10 is a plan view of the direction control cam of FIG. 5.

As shown in FIGS. 5 and 6, movement of the shift mechanism 208 rotates the shaft 39 causing cam follower 45 to change positions in cam slot 220 of mode selection cam 202. As shown in FIG. 5 and 10, movement of shifting mechanism 208 such that shaft 39 is rotated clockwise will cause cam follower 45 to move from the area N designated as neutral in cam slot 220 toward the area designated F for forward. This movement will cause the cam link 47 to rotate counterclockwise moving rod 53 forward from the transmission 27 which in turn will move selection link 33 connected to the transaxle 27 forward into the forward mode.

As previously mentioned, speed control cam 204 is also operatively mounted on shaft 39 and cooperates with shift lever 208 and mode selection cam 202. The speed control cam 204 likewise has a cam slot 222 for receiving a cam roller 224. The cam roller is attached to a cam link 226 at one end thereof. The cam link 226 basically consists of two members 228 and 230 arranged preferably at approximately 90° to each other. The cam link 226 is operatively pivotally connected to the vehicle at point 234 at the junction of the two members 228 and 230. A speed control rod 251 is operatively connected (see FIG. 6) to member 230 at point 236. The rod 251 extends rearwardly toward the transaxle and is operatively connected to a bracket 255. Speed control rod 251 has a member 254 operatively connected thereto at a point proximate the connection point 236. A sleeve 252 is operatively placed on the rod 251 and a spring 250 is positioned thereover. At the end of the rod 251 most remote from member 254, a pin 256 is positioned therein for cooperating with bracket 255 which is mounted on the end of the clutch rod 235.

The clutch rod 235 and the speed control rod 251 are operatively connected to an idler arm 259. A spring 257 is mounted between a point on a bracket 258 operatively connected to clutch rod 234 and a variator bracket 260 supporting the variator 67.

An idler arm 259 has a speed range sheave 81 mounted at the end opposite the clutch rod 234. The idler arm 259 is operatively connected to the frame of the vehicle by the variator bracket 260. The variator 67 which includes a first fixed location sleeve 73, a variator sleeve 75 and a second fixed located sleeve 77. The variator sleeve located between two fixed variator sleeves operates in a convention manner which is well known in the art. The variator 67, the variator bracket 260 and the idler arm 259 are assembled to the frame 13 in a conventional manner utilizing bolt 262 and nut 264 as illustrated in FIG. 6.

Figure 7:
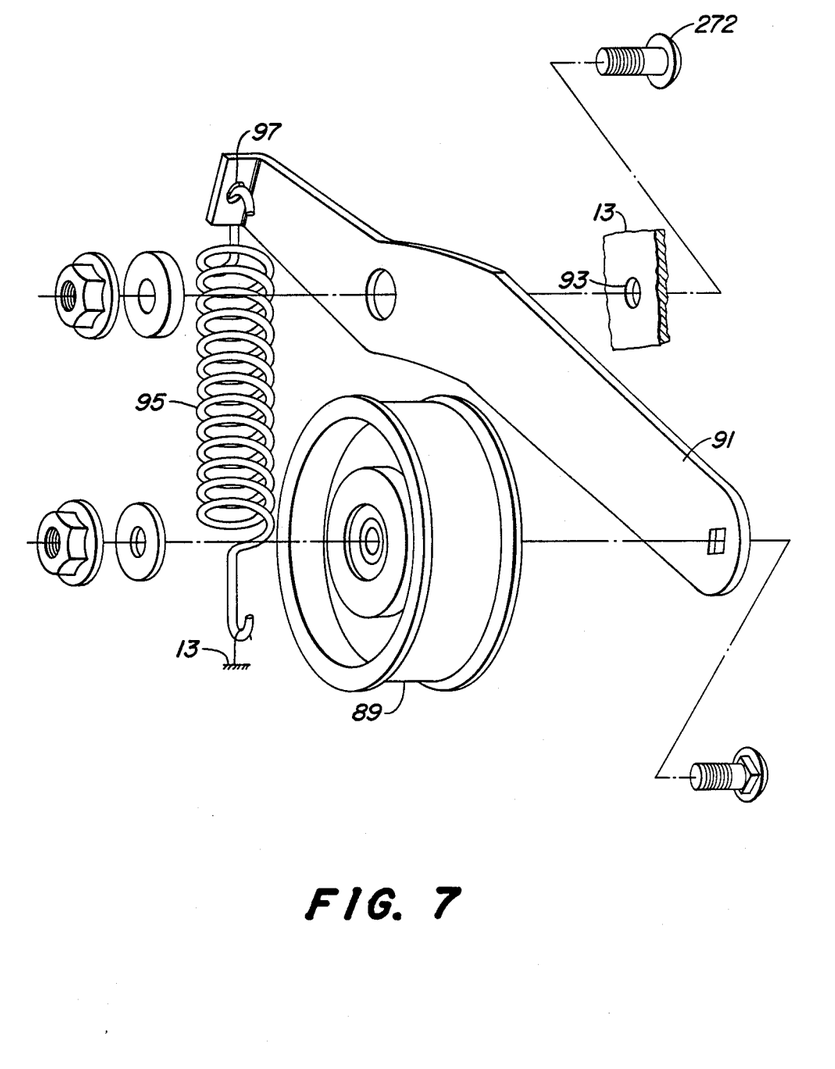
FIG. 7 is a partial exploded perspective view of the improved control system of the present invention illustrating additional components of the control system.

As shown in FIG. 7, the secondary arm 91 is connected to the frame 13 by bolt 272. A tension spring 95 is connected to a slot 97 at the end opposite the idler 89. The tension spring 95 is connected at the other end to frame 13.

Figure 8:
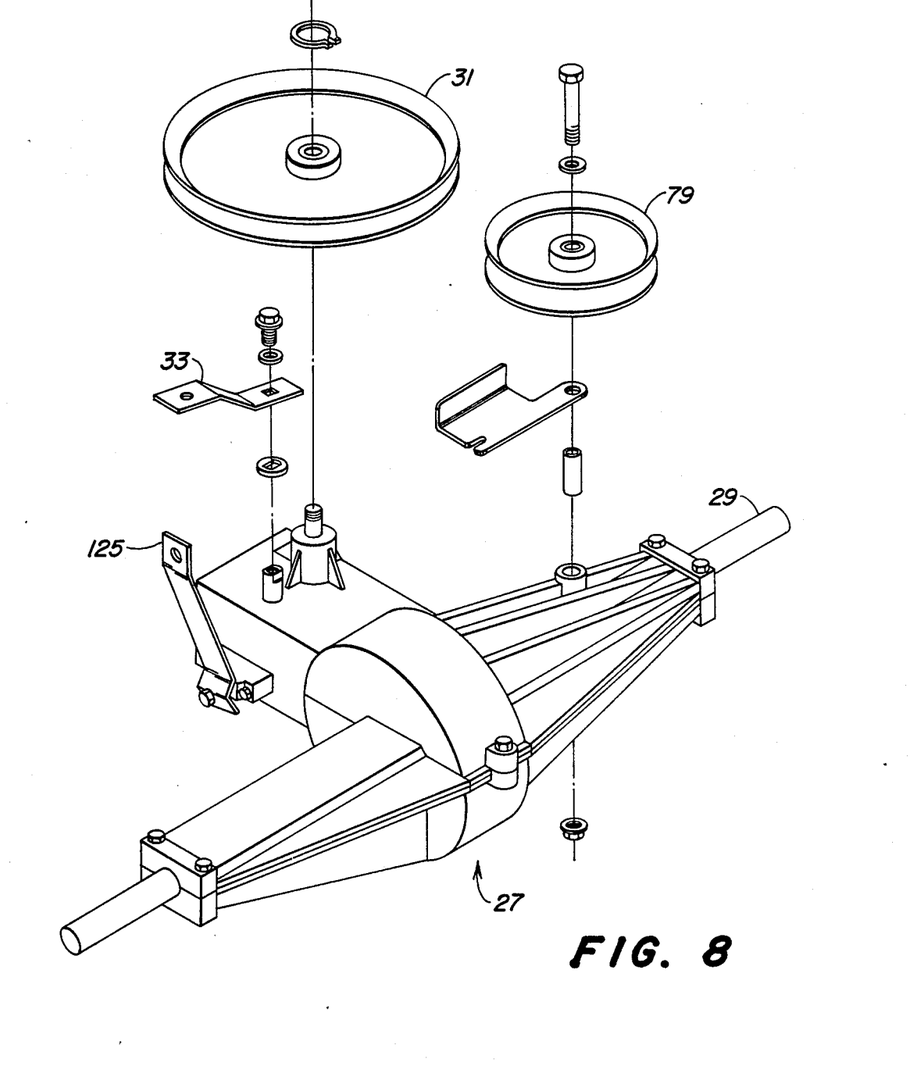
FIG. 8 is a partial exploded perspective view of the improved control system of the present invention illustrating the transaxle utilized therewith.

As shown in FIGS. 5, 6 and 8, with the transaxle in neutral, to simultaneously engage the transaxle in the forward mode and to selectively change the rate of rotation of the input sheave 31, the shift mechanism 208 is rotated clockwise thereby rotating shaft 39 clockwise. With the rotation of the shaft 39, the cam follower 45 is moved from the neutral position in cam slot 220 toward the forward position thereby engaging the forward mode of the transaxle. The cam follower 224 positioned in the cam slot 222 of speed cam 204 moves from the neutral position in the center toward the forward position. Cam slot 222 is designed such that as the shaft 39 is rotated clockwise, cam follower 224 attached to link 226 rotates arm 228 clockwise and leg 230 clockwise, thereby moving rod 251 rearward toward the transaxle 27 compressing spring 250. Spring 250 applies force on idler arm 259 causing the variator 67 to increase the rate of the input sheave 31 to the transaxle 27.

In operation, the clutch control rod 234 overrides the speed control rod 251 such that when the clutch pedal 19 is depressed, the idler arm 259 moves away from belt 85. Declutching would occur when the variator 67 reaches its slow speed and the idler arm continues to move away from the belt 85. Since the belt 87 has a continuous bias applied by the idler 89, idler arm 91 and spring 85, the variator 67 shifts to a slower speed, i.e., the input sheave 31 rate of rotation is reduced. Then the shift lever is overridden since the movement of the idler arm against bracket 255 compresses spring 250 without moving speed control rod 251. As soon as an operator were to let off of the clutch 19, spring 250 will push bracket 255 causing idler arm 259 to return to whatever gear was previously selected and the vehicle will increase speed until the bracket 255 on the clutch rod 234 hits the pin 256 on the speed control rod 251. Pin 256 limits the movement of bracket 255 and that limiting position depends on what gear is selected. If an operator were to select first gear, then the point where pin 256 contacts bracket 255 will be farther forward. The spring 257 connected to clutch rod bracket 258 helps spring 250 to override the belt forces and obtain a desired higher speed.

Figure 11:
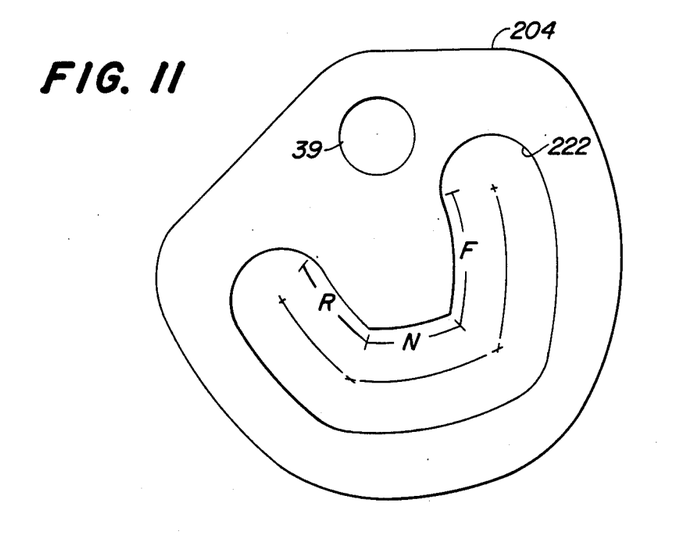
FIG. 11 is a plan view of the speed control cam of FIG. 5.

With reference to FIGS. 5, 10 and 11 the different cam profiles 202, 204 have different functions. The arm of the cam 202 profile labeled N, the neutral area, is the area where the actual mode shifting takes place. The center of the cam profile is neutral and as the follower moves towards R, or reverse the arm 47 shifts the transaxle into reverse. As you move towards F, or forward, the arm moves shifts the transaxle into forward. Once follower 45 reaches or goes beyond the F or the R point. The shaft 39 and cam 202 continue to rotate, but the arm 47 does not change position. Continual rotation only effects the position of the speed control rod 251. Moving cam 204 into the F position rotates arm 226 clockwise, speed control rod 251 relocates causing increased tension in the primary belt 85 and thus a higher speed. The central zones on cam 202 and 204 are coordinated such that when the transaxle is in neutral, the drive belts are maintained in the slowest position, so that upon mode engagement, the belts are ready to up-shift from the slowest position to a selected speed.

Moving the shift lever 208 in the opposite direction rotates the cam 204 counterclockwise positioning the mode cam 202 in reverse. Since there is only one reverse speed, there is some additional lever motion which enables the 2-½ miles per hour top reverse speed to be obtained. Thus, part of the cam 204 profile is utilized for compressing the spring 250 the necessary amount to achieve that speed. Each cam slot 202, 204 has sufficient overtravel built therein to insure that the cam followers 45, 224 do not bottom out therein prior to achieving the top forward or reverse speeds.

With specific reference to FIGS. 10 and 11, cams 202 and 204 and cam slots 220, 222 are particularly designed to complement each other and to coordinate the movements of the mode selection rod 53 and the speed control rod 251 with shift lever 208. Specifically, the cam slot profiles were designed to operate in unison so that by positioning the cam follower 45 in the cam slot 220 profile, the position of the cam follower 224 in cam slot 222 profile was coordinated to achieve simultaneous control of both the mode and the speed.

While the forms of apparatus herein described constitutes a preferred embodiment and an alternate embodiment of this invention, it is to be understood that the invention is not limited to those precise forms of apparatus, and that changes may be made therein without departing from the scope of the invention which is defined in the appended claims.

What is claimed is:

1. An improved vehicle control system for a vehicle having an operator's station with a clutch pedal and a brake pedal located therein, an engine which delivers output torque to an output sheave and a transaxle mounted to the underside of said vehicle's frame, said transaxle having an input sheave and being selectively shiftable to forward, neutral and reverse operational modes in response to movement of a mode selection link constituent to the transaxle, said output sheave being in communication with said input sheave through first and second belts drivingly mounted to a plurality of sheaves and a variator such that an increase in tension on the first belt causes said variator to increase the rate of rotation of the second belt, wherein the improvement comprises:
    a first rod pivotally mounted to said frame and extending transversely thereto;
    a cam fixably mounted to said first rod, said cam having a cam slot therein;
    a shift lever fixably mounted to said first rod and extending into said operator's station;
    a cam follower slidably mounted in said cam slot;
    a first support member fixably mounted to said frame;
    a cam link pivotally mounted to said first support member at a point along said cam link, said cam follower rotatably mounted to one end of said cam link;
    a mode selection rod pivotally mounted at one end to another end of said cam link and pivotally mounted at the other end to said mode selection link such that displacement of said lever causes said cam follower to slidably displace in said slot to a position corresponding to one of said transaxle modes which results in said cam link pivoting and displacing said mode selection link to the selected transaxle mode through said mode selection rod;
    an arm pivotally mounted to said frame and rotatably carrying a speed range sheave on a free end thereof in abutting relationship to said first belt; and
    means connected between said first rod and said arm for varying the position of said speed range sheave upon displacement of said shaft lever through a forward range.

2. The improved vehicle control system of claim 1, wherein said varying means comprises:
    a first link fixably mounted at one end to said first rod;
    a linking rod pivotally mounted at one end to the other end of said first link;
    a second support member fixably mounted to said frame;
    a transfer link pivotally mounted to said second support member, said linking rod's other end being pivotally mounted to said transfer link; and
    a second rod pivotally interconnecting said transfer link and said arm.

3. The improved vehicle control system of claim 2, further comprising:
    a brake lever; and
    a third rod, operatively connected to said brake lever and pivotally mounted to said brake lever at one end and to said brake pedal at the other end.

4. An improved vehicle control system for a vehicle having an operator's station with a clutch pedal and a brake pedal located therein, an engine which produces output torque through an output sheave and a transaxle mounted to the underside of said vehicle's frame, said transaxle having an input sheave and being selectively shiftable to forward, neutral and reverse operational modes in response to movement of a mode selection link constituent to the transaxle, said output sheave being in communication with said input sheave through first and second belts drivingly mounted to a plurality of sheaves and a variator such that an increase in tension on the first belt causes said variator to increase the rate of rotation of the second belt, wherein the improvement comprises:

a first rod pivotally mounted to said frame and extending transversely thereto;

a cam having a cam slot therein fixably mounted to said first rod;

a shift lever fixably mounted to said first rod and extending into said operator's station;

a cam follower slidably mounted in said cam slot;

a first support member fixably mounted to said frame;

a cam link pivotally mounted to said first support member at a point along said cam link, said cam follower being rotatably mounted to one end of said cam link;

a mode selection rod pivotally mounted at one end to another end of said cam link and pivotally mounted at the other end to said mode selection link such that displacement of said lever causes said cam follower to slidably displace in said slot to a position corresponding to one of said transaxle modes which results in said cam link pivoting and displacing said mode selection link to the selected transaxle mode through said mode selection rod;

a first link fixably mounted at one end to said first rod;

a linking rod pivotally mounted at one end to the other end of said first link;

a second support member fixably mounted to said frame;

a transfer link pivotally mounted to said second support member, said linking rod's other end pivotally mounted to said transfer link;

a second rod pivotally mounted to said transfer link at one end;

a shaft pivotally mounted to said frame;

an arm having a second slot formed therein fixably mounted to said shaft;

a speed range sheave rotatably mounted to said arm, and abutting said first belt;

a spring acting between the arm and frame for biasing the arm and speed range sheave toward a maximum speed position; and said other end of said second rod is slidably mounted in said second slot, such that further displacement of said shaft lever in the forward mode permits the spring to bias said arm to pivot causing said speed range sheave to move toward the maximum speed position.

5. The improved vehicle control system of claim 4, further comprising:

a tab fixably mounted to said shaft; and a clutch rod pivotally mounted at one end to said tab and pivotally mounted at the other end to said clutch pedal.

6. The improved vehicle control system of claim 4, further comprising said transaxle having a brake lever, a third rod pivotally mounted to said brake lever at one end and to said brake pedal at the other end.

7. The improved vehicle control system of claim 2 wherein a spring acting between the arm and frame biases the arm in a direction to move the speed range sheave to a maximum speed as selected by said shift lever, an arm slot is provided in said arm, one end of said second rod is slidably mounted in said slot whereby the spring normally maintains the one end of the second rod bottomed out in one end of the arm slot, and a clutch rod pivotally interconnects the arm and clutch petal so that upon depression of said clutch petal said arm is pivoted toward a slower speed position as said one end of said second rod slides in said arm slot.

8. The improved vehicle control system of claim 7 further comprising:

a brake lever operatively connected to said transaxle; and a third rod pivotally mounted to said brake lever at one end and to said brake pedal at the other end.

9. A mode and speed control system for a vehicle having an operator's station with a clutch pedal located therein, said system comprising:

an engine having an output means;

a transaxle having an input means and a mode control means, said engine output means and said transaxle input means being operatively interconnected;

a rod operatively connected to said vehicle;

a mode selection cam operatively mounted on said rod;

means for operatively connecting said mode selection cam to said transaxle;

a speed control cam operatively mounted on said rod;

a shift lever operatively connected to said rod;

means operatively connecting said transaxle and said engine such that the mode and the relative speed of said vehicle in either the forward or reverse mode is simultaneously controlled thereby;

a clutch control rod operatively connected to said clutch pedal;

an idler arm;

a belt system; and spring means for continuously biasing said belt system toward a relatively higher speed such that when said clutch pedal is depressed, said spring means bias is overcome thereby and said idler arm moves away from said belt system, thereby shifting said belt system to a relatively lower speed.

10. A mode and speed control system for a vehicle having a operator station with a clutch pedal located therein, an engine having an output means for delivering torque to a transaxle having an input means and a mode selection means operatively connected to said transaxle, said system comprising:

a belt system having a variator for controlling the relative rotation of said transaxle input means;

control means, operatively connected to said belt system and said transaxle mode selection means, for simultaneously controlling the mode and speed of said vehicle, said control means being simultaneously selectively shiftable between forward, neutral and reverse modes and between a plurality of forward and reverse speeds, depending upon whether said control means is in said forward or said reverse moded; and speed override means, operatively connected to said clutch pedal, said belt system and said control means for selectively varying either said forward or said reverse speed of said vehicle without shifting said control means.

11. The mode and speed control system of claim 10 wherein said speed override means further comprises:
a rod having a pair of brackets operatively positioned thereon and being operatively connected to said clutch pedal and said variator;
resilient means, operatively connecting one of said brackets and a variator bracket, for constantly biasing said speed override means toward said variator bracket.

12. The mode and speed control system of claim 10 wherein said belt system further comprises:
a primary belt system, operatively connected to said variator, for operatively interconnecting said engine, said variator and said control means;
a secondary belt system, operatively connected to said variator, for operatively interconnecting said variator and said transaxle.

13. The mode and speed control system of claim 12 wherein said primary belt system further comprises:
an idler sheave operatively connected to said transaxle;
a primary idler operatively connected to an idler arm and being located between said variator and said idler sheave; and
a first belt for interconnecting said idler sheave, said primary idler and said variator with said input sheave.

14. The mode an speed control system of claim 12 wherein said secondary belt system further comprises:
a first adjustable idler sheave operatively connected to an arm; and
a second belt for interconnecting said variator and said transaxle input means.

15. The mode and speed control system of claim 10 wherein said control means further comprises:
a rotatable shaft, control in said vehicle and being operatively connected to said mode selection means;
means, operatively connected to said shaft, for controlling the mode of said transaxle; and
means, operatively connected to said shaft, for controlling the speed of said vehicle in both said forward and said reverse modes.

16. The mode and speed control system of claim 15 wherein said mode control means further comprises:
a first cam having a cam slot operatively positioned on said shaft; and
a first cam follower operatively connected to said transaxle, for operative engagement with said cam slot.

17. The mode and speed control system of claim 16 wherein said speed control means further comprises:
a second cam having a cam slot, operatively connected to said shaft; and
a second cam follower operatively connected to said blet system, for operative engagement with said cam slot such that when said control means is positioned in a selected mode and speed position, said first cam and said second cam operatively cooperate to simultaneously position said transaxle in said selected mode and said variator in said selected speed position.

18. A mode and speed control system for a vehicle having an operator station with a clutch pedal located therein, said system comprising:
an engine having an output means;
a transaxle having an input means and a mode control means, said engine output means and said transaxle input means being operatively interconnected;
first control means, operatively connected to said transaxle, for controlling the mode of said transaxle output;
second control means, operatively connected to said transaxle mode control means and said transaxle input means, for simultaneously controlling the relative speed of said vehicle, said first and said second control means being operative to simultaneously shift said transaxle between the forward, neutral and reverse modes while controlling the relative speed of said vehicle in either the forward or the reverse mode; and
override means, operatively connected to said second control means, for selectively varying said vehicle speed in either of said forward or said reverse modes without varying the position of said second control means.

19. The system of claim 18 wherein said second control means further comprises:
a rod operatively connected to said vehicle;
a speed control cam operatively mounted on said rod;
a shift lever operatively connected to said rod; and
means for operatively connecting said speed control cam to said first control means.

20. The system of claim 18 wherein said first control means further comprises:
a rod operatively connected to said vehicle;
a mode selection cam operatively mounted on said rod;
a shift lever operatively connected to said rod; and
means for operatively connecting said mode control cam to said second control means.

21. The system of claim 19 wherein said override means further comprises:
a clutch control rod operatively connected to said clutch pedal;
an idler arm;
a belt system; and
spring means for continuously biasing said belt system toward a relatively higher speed such that when said clutch pedal is depressed thereby overriding said spring means, said idler arm moves away from said belt system, thereby shifting said belt system to a relatively lower speed.

22. The system of claim 21 wherein depending upon the degree by which the clutch pedal is depressed, the speed of said vehicle is varied, when said clutch is slightly depressed, said vehicle speed is only slightly lessened, when said vehicle clutch is fully depressed, said vehicle speed is reduced to zero or near zero, depending upon the terrain on which said vehicle is operating at the time that said clutch pedal is fully depressed, said vehicle relative speed being controlled by the position of said clutch pedal independently of the position of said second control means.

* * * * *

UNITED STATES PATENT AND TRADEMARK OFFICE
CERTIFICATE OF CORRECTION

PATENT NO. : 4,771,856
DATED : 20 September 1988
INVENTOR(S) : Wayne R. Hutchison et al It is certified that error appears in the above-identified patent and that said Letters Patent is hereby corrected as shown below:

```
Column 10, line 10, delete "petal" and insert -- pedal --, both
occurrences.
Column 10, line 63, delete "moded" and insert -- mode -- .
Column 11, line 28, delete "an" and insert -- and -- .
Column 11, line 36, delete "control in said vehicle and
being"; lines 37 and 38, delete "mode selection means" and
insert -- control means -- ; line 56, delete "blet" and
insert -- belt -- .
```

Signed and Sealed this

Twenty-sixth Day of September, 1989

Attest:

DONALD J. QUIGG

Attesting Officer

Commissioner of Patents and Trademarks